Figure 1:
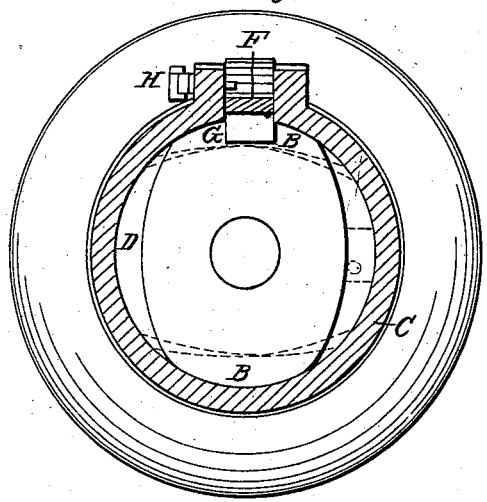
Figure 2:
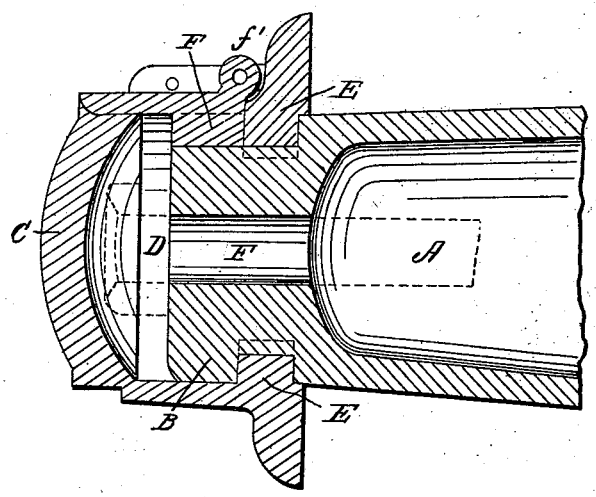
Figure 3:
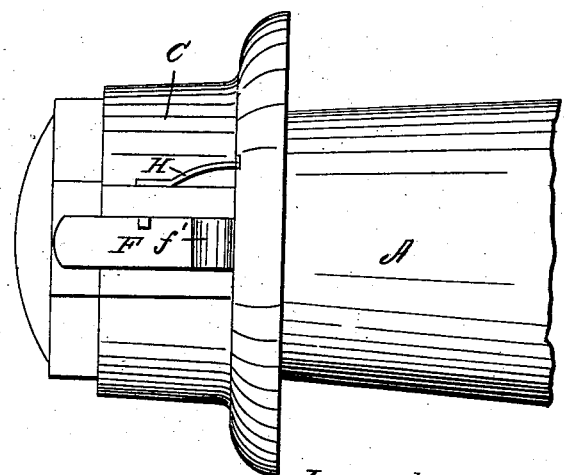

J. R. SMITH.
Lock Nut for Axle and Skein Boxes.

No. 77,411. Patented April 28, 1868.

Witnesses:
Edward Wichelm
Gottlob Burkhardt

Inventor:
Joseph R Smith
By E.B. & W.H. Forbush, attys.

UNITED STATES PATENT OFFICE.

JOSEPH R. SMITH, OF BETHEL, CONNECTICUT, ASSIGNOR TO HIMSELF AND WINFIELD S. SHAW, OF BUFFALO, NEW YORK.

IMPROVEMENT IN LOCK-NUT FOR AXLE AND SKEIN BOXES.

Specification forming part of Letters Patent No. 77,411, dated April 28, 1868.

*To all whom it may concern:*

Be it known that I, JOSEPH R. SMITH, of Bethel, county of Fairfield, and State of Connecticut, (assignor to myself and W. S. SHAW,) have invented a Lock-Nut for Axle and Skein Boxes; and I do hereby declare that the following is a full, clear, and exact description thereof, reference being had to the accompanying drawings, making a part of this specification, in which—

Figure I is a plan view of my said invention. Fig. II is a longitudinal section of same; and Fig. III is a cross-section on line 1 2, Fig. II.

Like letters refer to like parts in each of the figures.

My invention relates to the manner of securing nuts or washers to wagon or carriage axles to hold the wheels against lateral movement thereon, and is equally applicable to solid iron axles or to skein-boxes.

It consists in making the nut with internal lips or flanges, and the end of the axle or skein box with external lips or flanges, the spaces between the lips in the nut corresponding to the lips on the axle, and vice versa, so that, the nut being applied to the axle, the lips of the nut may pass beyond the lips of the axle, and by a slight turning of the nut be made to interlock therewith in a manner to secure the nut firmly to the axle.

A represents the axle or skein box, and B the external lips or flanges thereon. C represents the nut, and D its chamber, which receives the end of the axle. Its internal lips or flanges are shown at E. The spaces between these lips are made slightly greater than the length of the lips B on the axle, so that the end of the axle may enter the chamber of the nut far enough to cause the lips of the nut to lock behind those of the axle when the nut is turned upon the axle. F represents a key hinged to one side of the nut, as shown at $f'$, and projecting into the chamber D through a recess cut through the side of the nut. A notch, G, is cut in one of the lips B, into which the key drops when, by the turning of the nut on the axle, the notch and key come in line, thereby securely locking the nut upon the axle, and preventing its removal without first raising the key from the notch.

The notch should be located at the upper side of the axle, so that the gravity of the key will act to keep it in the notch; but, if required, a spring-catch, H, may be applied to the key to insure against any possibility of the key working out of its notch by jars or otherwise.

The chamber D, when the nut is applied to a skein-box, should extend beyond the end of the box far enough to clear the head of the bolt I, by which the box is fastened to the axle.

This manner of securing the nut to the axle is much cheaper and better than the screw-thread now commonly employed, and the convenience of attaching and detaching the same is greatly improved.

What I claim, and desire to secure by Letters Patent, is—

1. The internal lip on the nut and the external lip on the axle or skein box, to secure the nut on the axle or box, as set forth.

2. The combination of the key F with the spring-catch and the intervening lips of the nut and axle, as and for the purpose specified.

JOSEPH R. SMITH.

Witnesses:
WM. BOLLARD,
C. F. FRASER.